US009967047B2

(12) United States Patent
Le Kernec et al.

(10) Patent No.: US 9,967,047 B2
(45) Date of Patent: May 8, 2018

(54) METHOD AND DEVICE FOR OPTICAL TRANSMISSION AT ADAPTIVE EFFECTIVE RATES (71) Applicant: THALES, Neuilly-sur-Seine (FR)

(72) Inventors: Arnaud Le Kernec, Toulouse (FR); Mathieu Dervin, Toulouse (FR); Michel Sotom, Toulouse (FR)

(73) Assignee: THALES, Courbevoie (FR)

( * ) Notice: Subject to any disclaimer, the term of this patent is extended or adjusted under 35 U.S.C. 154(b) by 363 days.

(21) Appl. No.: 14/297,469

(22) Filed: Jun. 5, 2014

(65) Prior Publication Data
US 2014/0362875 A1 Dec. 11, 2014

(30) Foreign Application Priority Data

Jun. 7, 2013 (FR) ...................................... 13 01304

(51) Int. Cl.
H04J 14/02 (2006.01)
H04B 10/112 (2013.01)
(Continued)

(52) U.S. Cl.
CPC ............ *H04J 14/02* (2013.01); *H04B 10/112* (2013.01); *H04B 10/118* (2013.01); *H04B 10/25752* (2013.01); *H04B 10/29* (2013.01)

(58) Field of Classification Search
CPC ..................... H04W 84/06; H04J 14/02; H04J 14/0206–14/0208; H04J 14/021;
(Continued)

(56) References Cited

U.S. PATENT DOCUMENTS

2002/0051284 A1* 5/2002 Takatsu ............... G06F 12/0866
359/341.1
2004/0208602 A1 10/2004 Plante
(Continued)

FOREIGN PATENT DOCUMENTS

EP 1592153 A1 11/2005
FR 2957214 A1 9/2011
WO 03088542 A1 10/2003

OTHER PUBLICATIONS

Todd G. Ulmer, et al., "Differential Phase-Shift Keying in Spatial Diversity Transmitters for Fade Mitigation", IEEE Journal of Selected Topics in Quantum Electronics, Sep. 1, 2010, pp. 1091-1098, vol. 16, No. 5, IEEE Service Center, Piscataway, NJ, USA, XP011299327.

*Primary Examiner* — Eric Myers
(74) *Attorney, Agent, or Firm* — Baker & Hostetler LLP (57) ABSTRACT A method for transmitting digital data by a primary optical signal between a transmitter terminal and a receiver terminal, involves the following steps: determining a magnitude characterizing optical-wave degradation between the transmitter terminal and the receiver terminal, determining a number of transmission channels by a decreasing function of the magnitude characterizing optical-wave degradation, distributing the digital data over the transmission channels, modulating optical signals of different wavelengths using digital data distributed over the transmission channels, generating the primary optical signal by wavelength multiplexing of the optical signals, and sending a transmission configuration, including at least the number of transmission channels, from the transmitter terminal to the receiver terminal.

20 Claims, 9 Drawing Sheets (51) Int. Cl.
*H04B 10/118* (2013.01)
*H04B 10/2575* (2013.01)
*H04B 10/29* (2013.01)

(58) Field of Classification Search
CPC .............. H04J 14/0213; H04J 14/0272; H04J 14/0275; H04B 10/07; H04B 10/079; H04B 10/0795–10/0799; H04B 10/25752; H04B 10/29
See application file for complete search history.

(56) References Cited

U.S. PATENT DOCUMENTS

| | | | | |
|---|---|---|---|---|
| 2005/0213966 A1* | 9/2005 | Chown | ............... | H04J 14/0221 398/27 |
| 2008/0225182 A1* | 9/2008 | Silver | ................. | H04N 5/4401 348/726 |
| 2012/0282854 A1* | 11/2012 | Arcidiacono | ......... | H04H 40/90 455/3.02 |
| 2013/0336661 A1 | 12/2013 | Chorvalli | | |
| 2014/0064304 A1* | 3/2014 | Hung | ................. | H04B 10/272 370/535 |

* cited by examiner

METHOD AND DEVICE FOR OPTICAL TRANSMISSION AT ADAPTIVE EFFECTIVE RATES

CROSS-REFERENCE TO RELATED APPLICATION

This application claims priority to foreign French patent application No. FR 1301304, filed on Jun. 7, 2013, the disclosure of which is incorporated by reference in its entirety.

FIELD OF THE INVENTION

The present invention relates to a method for transmitting an optical signal in which the effective data rate is adapted as a function of the disturbances on the propagation channel. The invention also relates to an optical-signal transmission device designed to implement such a method.

BACKGROUND

Communication by optical signal is a known technology that uses the propagation of light to transmit information over a communication channel between two remote points. It is already used to exchange information between satellites or between a satellite and a fixed terminal on the earth, and is commonly used in terrestrial fiber-optic telecommunication networks. An optical signal, for example a laser beam modulated by effective data, is sent from a transmitter terminal to a receiver terminal. In general, the communication channel of an optical transmission device can be empty space (the atmosphere, space), the marine environment, an optical guide or any other medium that is transparent to light. The conditions for transmitting an optical signal through these different media may vary over time or space. These disturbances cause a deterioration in the quality of the optical signal received by the receiver terminal (attenuated signal, random phase) and are liable to alter the data being transmitted.

Figure 1:
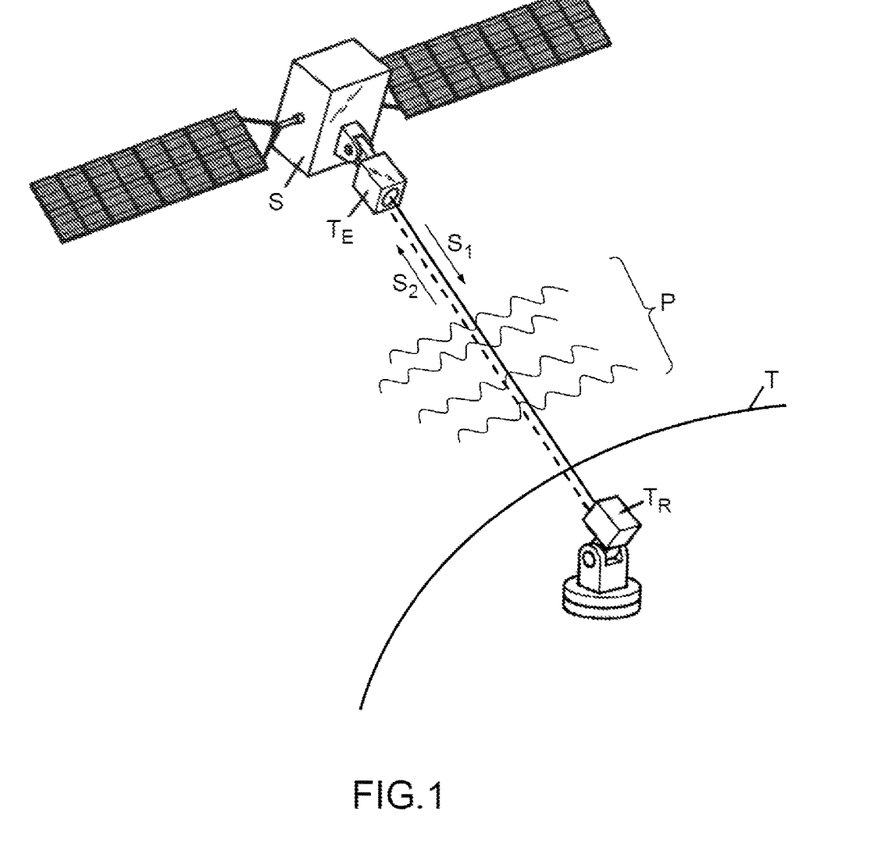
FIG. 1, already mentioned, shows an example of optical transmission between a satellite and the earth, in which the method can be implemented.

As shown in FIG. 1, a satellite S is fitted with a transmitter terminal $T_E$ that sends digital data to a receiver terminal $T_R$ located on the earth T using a primary optical signal $S_1$. The terrestrial atmosphere may disturb the propagation of the signal between the two terminals and thereby cause transmission errors in the digital data. Various techniques have been developed to adapt the optical transmission to the disturbances P on the communication channel. Document FR2957214, which describes an optical transmission method using laser signals in which an encoding rate of the digital data sent by a laser signal is adapted as a function of the propagation conditions of the laser beam, is in particular known. To take account of the effect of these disturbances P on the optical transmission, the use of a secondary optical signal $S_2$, sent by the receiver terminal and received by the transmitter terminal, is known. The propagation conditions of the optical signal, characterized by the secondary optical signal $S_2$ received by the transmitter terminal, make it possible to adapt the encoding rate, and therefore the effective rate, in real time. A low encoding rate is used for highly disturbed optical transmission, so the effective digital data in the signal sent has a greater degree of redundancy.

The adaptation of the effective rate according to known solutions only enables transmission to be maintained for disturbances of moderate amplitude or, when it relates to interlacing, for significant disturbances of limited duration. If significant attenuation occurs, or attenuation occurs over an excessively long period in relation to the foreseeable interlacing periods in practice, these known solutions do not provide a satisfactory effective rate. It is therefore desirable to use an optical transmission method that makes it possible to adapt and optimize the effective rate transmitted over an extended range of disturbances on the transmission channel, while enabling fine tuning of adaptation of the effective rate within this range.

SUMMARY OF THE INVENTION

The invention is intended to propose an alternative solution that overcomes these difficulties by implementing both wavelength multiplexing and variable-rate encoding to best adapt the effective rate over an extended range of variations in the propagation conditions of the optical wave.

For this purpose, the invention relates to a method for transmitting digital data using a primary optical signal between a transmitter terminal and a receiver terminal, characterized in that it involves the following steps:
  determining a magnitude characterizing optical-wave degradation between the transmitter terminal and the receiver terminal,
  determining a number of transmission channels by means of a first stepwise decreasing function of the magnitude characterizing optical-wave degradation,
  distributing the digital data over the transmission channels,
  modulating optical signals of different wavelengths, of which there are as many as there are transmission channels; each of the respective optical signals being modulated by digital data distributed respectively to one of the transmission channels,
  generating the primary optical signal by means of wavelength multiplexing of the optical signals,
  sending a transmission configuration from the transmitter terminal to the receiver terminal; the transmission configuration including at least the number of transmission channels.

The invention also relates to a device for transmitting digital data using a primary optical signal including a transmitter terminal and a receiver terminal; said transmitter terminal including:
  a processor including means for distributing and sending digital data over transmission channels,
  optical sources that are able to send optical signals of different wavelengths; each of the optical sources having means to modulate the optical signal of said optical source as a function of digital data sent by the processor over a transmission channel,
  a wavelength multiplexer able to generate the primary optical signal by wavelength multiplexing of optical signals sent by the optical sources;
  means for determining a magnitude characterizing optical-wave degradation between the transmitter terminal and the receiver terminal,
  a distribution module, implemented in the processor, that is able to distribute the digital data over a number of transmission channels that is less than or equal to the number of optical sources,
  a control module, implemented in the processor, that is able to determine the number of transmission channels by means of a stepwise decreasing function of the magnitude characterizing optical-wave degradation,
  activation means for a number of optical sources equal to the number of transmission channels; the primary optical signal being generated by multiplexing the optical signals sent by the optical sources thus activated; each of the optical signals being modulated by digital data.

BRIEF DESCRIPTION OF THE DRAWINGS

The invention is further explained and other advantages given in the detailed description of the embodiments given by way of example in the following figures.

For the sake of clarity, the same elements are marked with the same reference signs in all of the figures.

DETAILED DESCRIPTION

Figure 2:
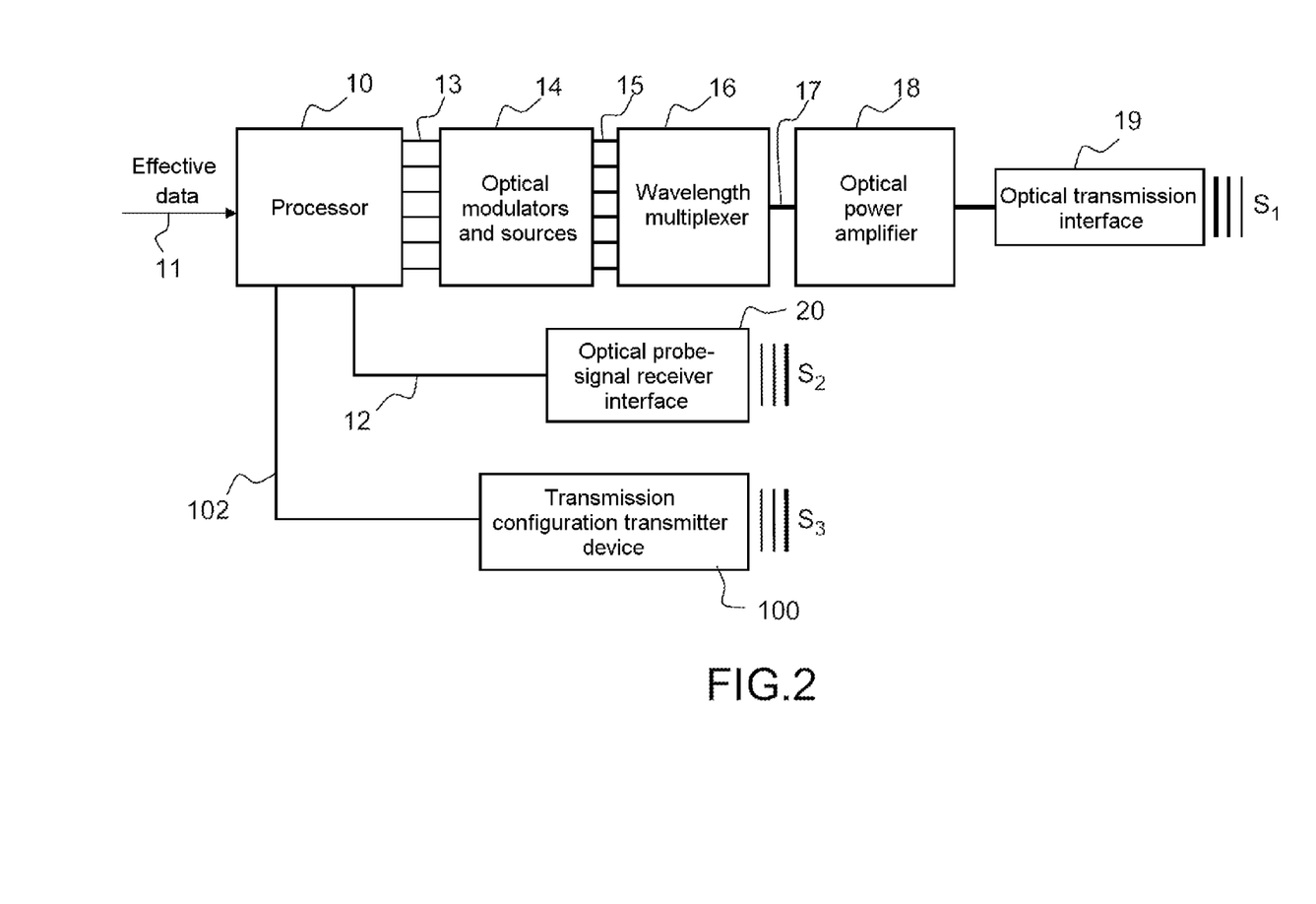
FIG. 2 shows the main functional modules of an optical-transmission transmitter terminal according to the invention.
Figure 3:
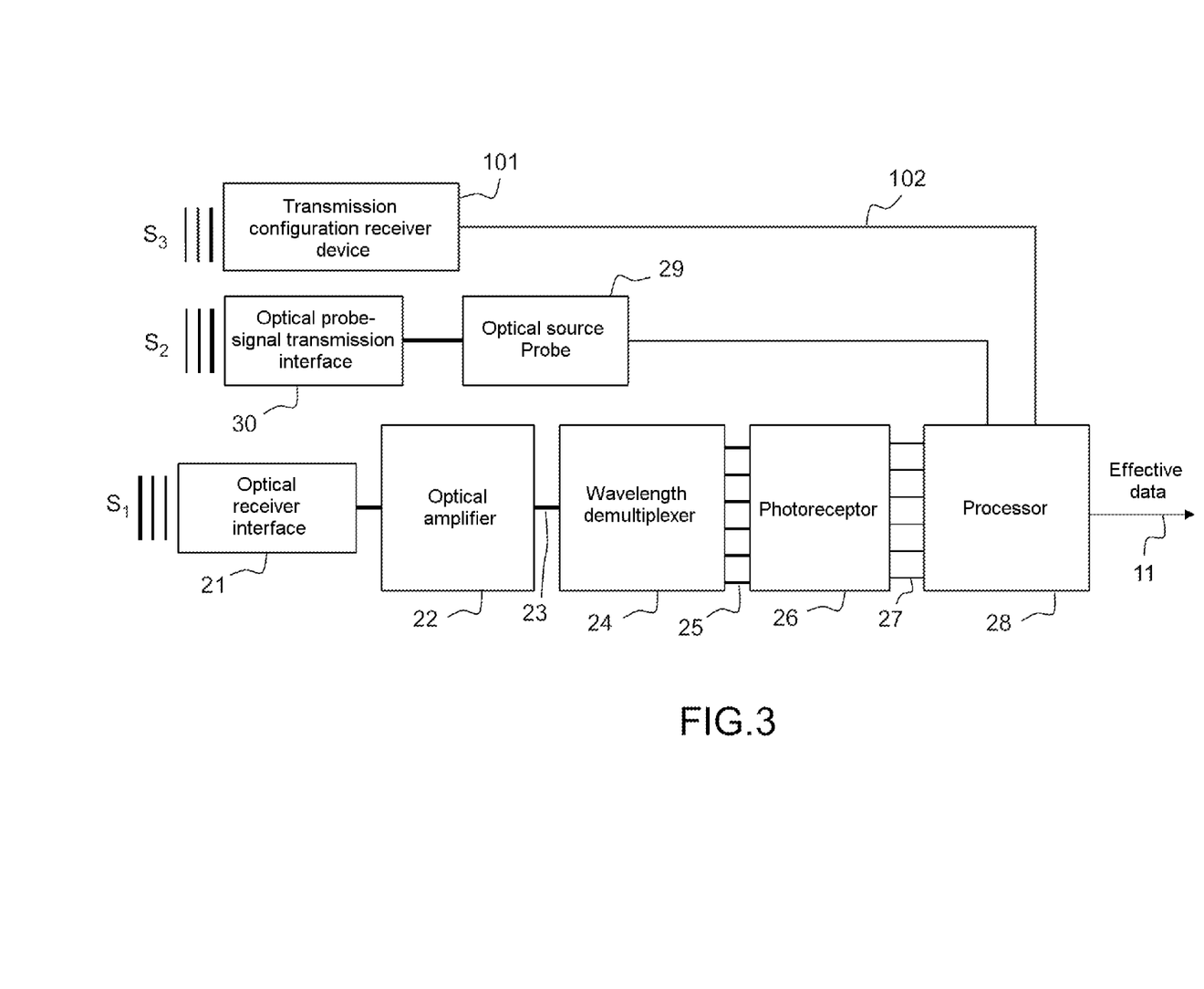
FIG. 3 shows the main modules of an optical-transmission receiver terminal according to the invention.

A device for transmitting digital data by optical signal includes firstly a transmitter terminal $T_E$, of which the main functional modules are shown in FIG. 2, and secondly a receiver terminal $T_R$, of which the main functional modules are shown in FIG. 3.

According to FIG. 2, the transmitter terminal $T_E$ includes:
a processor 10 including means for distributing and sending digital data 11 over transmission channels 13,
optical sources 14 that are able to send optical signals 15 of different wavelengths; each of the optical sources 14 having means to modulate the optical signal 15 of said optical source 14 as a function of digital data 11 sent by the processor 10 over a transmission channel 13,
a wavelength multiplexer 16 able to generate an optical signal 17 by wavelength multiplexing of optical signals 15 sent by the optical sources 14;
an optical power amplifier 18 able to generate a primary optical signal $S_1$ by amplification of the optical signal 17 sent by the wavelength multiplexer 16,
an optical interface 19 for transmitting the primary optical signal $S_1$ to the receiver terminal $T_R$.
An optical interface 20 for receiving a secondary optical signal $S_2$ sent by the receiver terminal $T_R$; a magnitude 12 characterizing optical-wave degradation between the transmitter terminal $T_E$ and the receiver terminal $T_R$ being measured by receipt of the optical signal $S_2$ sent by the receiver terminal $T_R$ to the transmitter terminal $T_E$. It should be noted at this stage that this optical receiver interface 20 is an option for the device according to the invention; if predictions regarding this degradation are available, this optical receiver interface 20 need not be implemented,
a device 100 for sending a tertiary signal $S_3$ to the receiver terminal $T_R$, in which the tertiary signal $S_3$ carries a transmission configuration 102 enabling the receiver terminal $T_R$ to process the effective data 11 sent via the primary optical signal $S_1$. As detailed below, the transmission configuration 102 includes at least the number of transmission channels 13 implemented for transmission of the effective data, such as to enable the primary optical signal $S_1$ to be processed by the receiver terminal $T_R$. It should be noted at this stage that this transmission device 100 is an option for the device according to the invention. Details are given below of the alternative options enabling transmission of the transmission configuration 102 between the two terminals; these alternative options not requiring implementation of the transmission device 100.

According to FIG. 3, the receiver terminal $T_R$ includes:
an optical interface 21 for receiving the primary optical signal $S_1$ sent by the transmitter terminal $T_E$,
an optical amplifier 22 able to generate an optical signal 23 by amplifying the primary optical signal $S_1$,
a wavelength demultiplexer 24 that is able to generate optical signals 25 of different wavelengths by demultiplexing the optical signal 23,
converters 26 that are able to convert each of the optical signals 25 of different wavelengths into electrical signals 27,
a processor 28, including means for recombining electrical signals 27 to reconstitute digital data 11 sent by the transmitter terminal $T_E$,
an optical source 29 and an optical transmission interface 30 able to send the secondary optical signal $S_2$ to the transmitter terminal $T_E$. As is the case with the optical receiver interface 20, implementing this optical transmission interface 30 is an option for the present invention. If predictions regarding degradation of the optical wave are available, this optical receiver interface 30 need not be implemented,
a device 101 for receiving the tertiary signal $S_3$ sent by the transmitter terminal $T_E$, in which the tertiary signal transmits the transmission configuration 102 to enable the primary optical signal $S_1$ to be processed by the receiver terminal $T_R$. As is the case for the transmitter device 100, implementation of the receiver device is optional in the present invention. Details of alternative options that do not require implementation of the receiver device 101 are given below.

The conditions for transmitting the optical wave between the transmitter terminal $T_E$ and the receiver terminal $T_R$ are determined by the transmitter terminal by means of a reception characteristic of the secondary optical signal $S_2$, referred to as the magnitude 12 characterizing optical-wave degradation between the transmitter terminal $T_E$ and the receiver terminal $T_R$. This provides the transmission device, in real time, with a magnitude representing the transmission conditions, enabling it to continuously adapt transmission of the digital data. Thus, the transmitter terminal according to the invention includes means for measuring a magnitude 12 characterizing optical-wave degradation between the transmitter terminal $T_E$ and the receiver terminal $T_R$. Advantageously, the magnitude 12 characterizing optical-wave degradation is a reception power or a reception direction of the secondary optical signal $S_2$ received by the transmitter terminal $T_E$. In an alternative embodiment, the transmission conditions of the optical wave between the transmitter terminal $T_E$ and the receiver terminal $T_R$ are also known and progress in a predetermined manner. They may for example be predicted on the basis of knowledge of the trajectory of the satellite.

The transmission device logically includes the same number of optical sources 14 and converters 26, referred to as the maximum number of transmission channels $N_{max}$. As detailed below, the transmission device makes it possible to cover a disturbance range that gets wider as the maximum number of transmission channels $N_{max}$ increases. However, if this number is too high, the hardware issue becomes more complicated.

The invention relates firstly to an optical transmission method that adapts the number of wavelengths multiplexed to the transmission conditions of the optical wave between the transmitter terminal and the receiver terminal. To do so, the method according to the invention includes the following steps:
- determining a magnitude 12 characterizing optical-wave degradation between the transmitter terminal $T_E$ and the receiver terminal $T_R$,
- determining a number Nλ of transmission channels 13 by means of a first stepwise decreasing function of the magnitude 12 characterizing optical-wave degradation,
- distributing the digital data 11 over the transmission channels 13,
- modulating optical signals 15 of different wavelengths, of which there are as many Nλ as there are transmission channels; each of the respective optical signals 15 being modulated by digital data 11 distributed respectively to one of the transmission channels 13,
- generating the primary optical signal ($S_1$) by means of wavelength multiplexing of the optical signals 15.
- sending a transmission configuration 102 from the transmitter terminal $T_E$ to the receiver terminal $T_R$; the transmission configuration 102 including at least the number Nλ) of transmission channels 13.

During a digital-data transmission session between the transmitter terminal and the receiver terminal, the method adapts, in real time, the number of transmission channels 13 to suit the transmission conditions. Thus, if the transmission conditions are good, the method uses a high number Nλ of transmission channels, for example a number equal to the maximum number of transmission channels $N_{max}$. The bit rate of the optical signal obtained following multiplexing is equal to the sum of the bit rates of the optical sources, the optical power delivered by the amplifier 18 is shared between the different optical sources 14 used. If the transmission conditions deteriorate, it is possible to maintain the quality of the signal by using fewer transmission channels 13. After the amplification step, the optical power of the primary optical signal $S_1$ delivered by the amplifier 18 is then concentrated on fewer optical sources 14, helping to improve the received signal-noise ratio and thereby to reduce the bit error rate of the digital data received by the receiver terminal.

To improve transmission quality, it is also possible to encode the digital data to be sent. Encoding typically involves adding redundancy to the digital data sent in relation to the effective information. For example, in the case of systematic codes, this redundancy may involve adding parity bits to detect potential errors in the effective signal received after transmission. The bit rate transmitted is then the sum of the effective bit rate, which corresponds to the binary volume of the effective information, and of the redundant bit rate resulting from the encoding operation. In general, for systematic or non-systematic codes, the encoding rate η is defined as the ratio between the effective bit rate and the output bit rate transmitted from the encoder, i.e. after encoding.

Advantageously, the method includes the following steps:
- determining an encoding rate η, using a second decreasing function of the magnitude 12 characterizing optical-wave degradation,
- encoding the digital data 11 distributed to each of the transmission channels 13 according to the previously determined encoding rate η;

In this case, the transmission configuration 102 includes, in addition to the number Nλ of transmission channels 13, the encoding rate η, to enable adapted decoding of the effective data received by the receiver terminal $T_R$.

Another technique for processing digital data involves interlacing the data to be transmitted. This technique makes it possible to extend the correction capacity of certain error-correcting codes to longer erroneous bit sequences than if the error-correcting code is used on its own. Such erroneous bit sequences may occur if the transmission conditions are highly degraded for a relatively long period of time. The principle of interlacing is to mix up the encoded bits before transmission according to a predetermined scheme, and then to put them back into order on receipt, before decoding, using the same scheme. Accordingly, signal samples significantly affected by a long-lasting attenuation episode in the propagation channel are spread throughout shorter erroneous sequences that do not exceed the correction capacities of the code used.

Advantageously, the method includes an interlacing step for the digital data 11 distributed to each of the transmission channels 13. In this case, the transmission configuration 102 also includes the number Nλ of transmission channels 13, and possibly the encoding rate η, configuration information on the interlacing method used, to enable adapted de-interlacing of the effective data received by the receiver terminal $T_R$. Such configuration information enables the interlacing to be optional, or even enables a choice from several predefined interlacing functions. The transmission configuration need not be sent if the interlacing is determined by the waveform.

To send the transmission configuration 102 to the receiver terminal, a first option was mentioned involving implementing, on the transmitter terminal $T_E$, a device 100 for sending a tertiary signal $S_3$ to a receiver device 101 of the receiver terminal $T_R$. Advantageously, the tertiary signal $S_3$ may be an optical signal with a wavelength different to all of those already used for transmitting the actual effective data, i.e. different from the wavelengths of the optical signals 15 carrying the effective data 11. In this case, the transmitter device 100 may include a laser source, a modulation function for the optical signal, an encoding function, possibly a power amplifier, and possibly an optical interface enabling coupling to the propagation environment, for example a secondary telescope in the case of spatial optical transmission. It should also be noted that the optical interface of the device 100 for transmitting the tertiary signal $S_3$ may be combined with the optical interface 20 for receiving the secondary signal $S_2$.

Upon receipt, the receiver device 101 therefore includes a reception interface, for example a telescope, and possibly an incoming amplification, demodulation and decoding function. This optical transmission is preferably low rate, thereby enabling a very high encoding rate and a link that is much more robust to the disturbances P on the communication channel. Thus, in the event of very high degradation of the transmission conditions, loss of the transmission link of the transmission configuration 102 necessarily means that the transmission conditions are too poor for transmission of effective data. It should be noted that this additional transmission device can also perform other functions, such as lock-on beacon for the direction, acquisition and tracking system of the receiver terminal.

In an alternative embodiment, the tertiary signal $S_3$ may be a hyperfrequency signal. In this case, known satellite-ground transmission techniques can advantageously be used since the quantity of data to be transmitted, i.e. the content of the transmission configuration 102, is in this case very small, and therefore the transmission thereof does not give rise to any particular difficulty.

Alternative options enabling the transmission configuration 102 to be sent to the receiver terminal that do not require implementation of the transmitter or receiver devices 100, 101 for the tertiary signal $S_3$, are also described below.

Figure 4A:
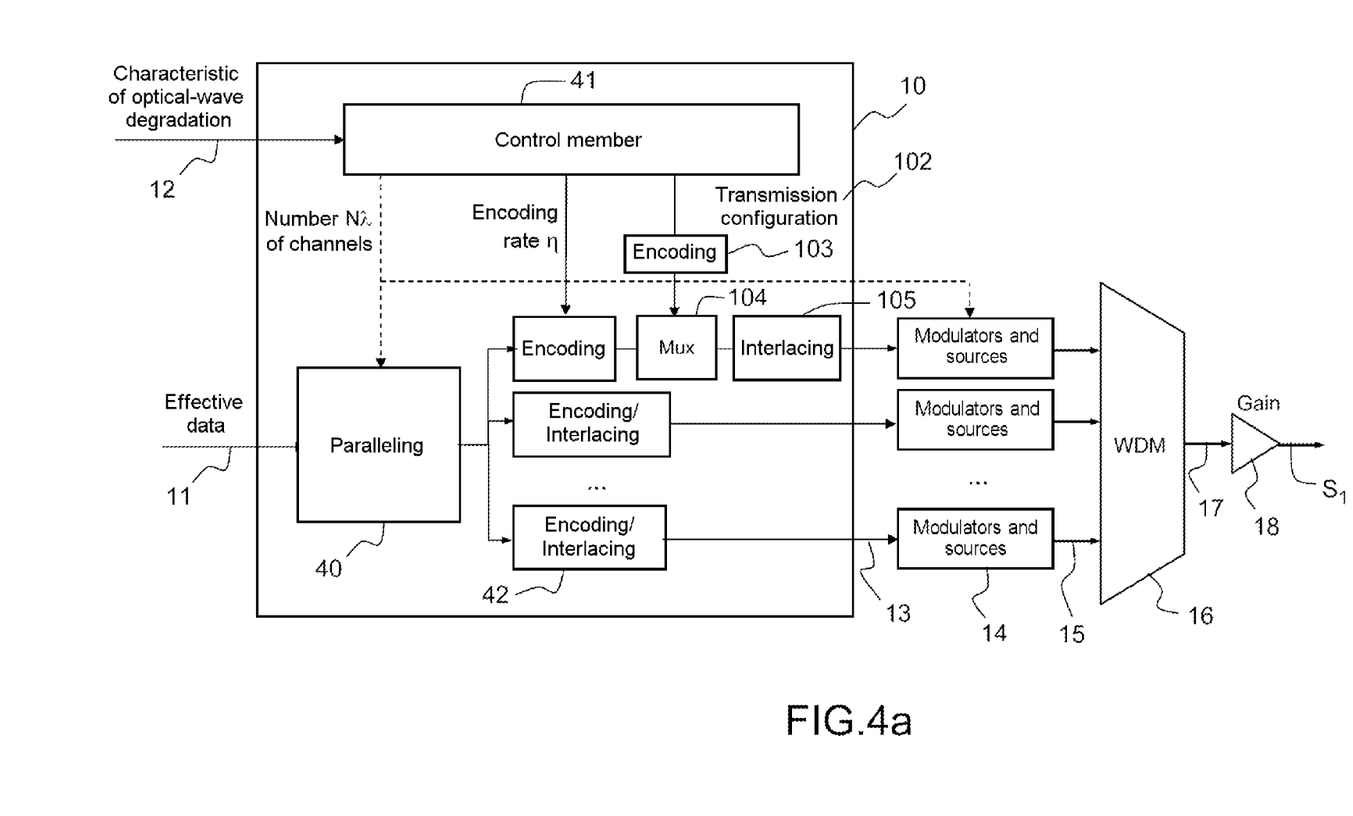
FIGS. 4a and 4b show the functional architecture of a transmitter terminal and of a receiver terminal respectively according to a first embodiment of the invention.
Figure 4B:
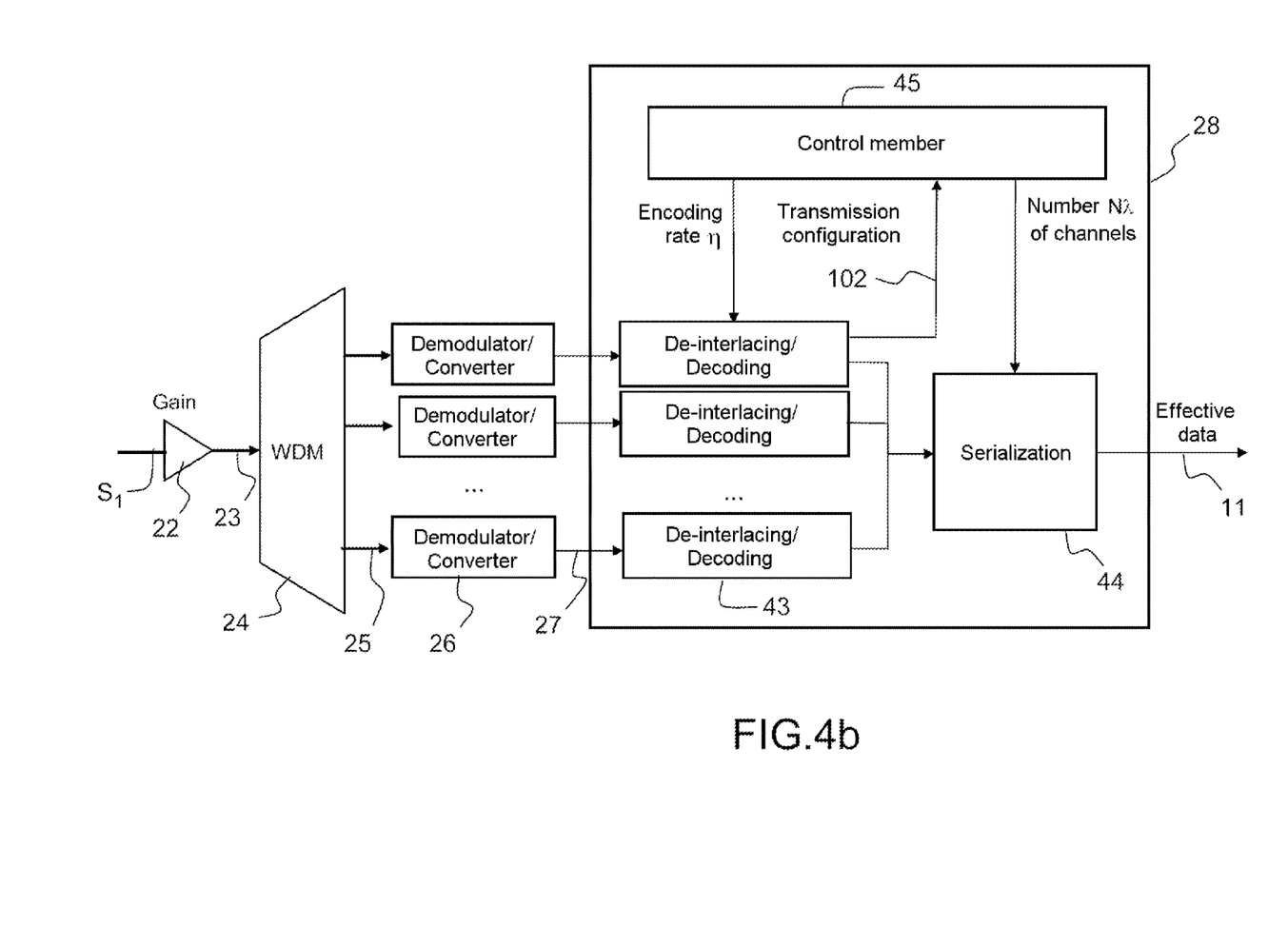

FIGS. 4a and 4b show the functional architecture of a transmitter terminal and of a receiver terminal respectively according to a first embodiment of the invention.

As described above, the transmitter terminal of the transmission device includes a processor 10 used to distribute the digital data 11. The device thus includes a distribution module 40, also referred to as paralleling, implemented in the processor 10 and able to distribute the digital data 11 over a number Nλ of transmission channels 13 that is less than or equal to the maximum number of transmission channels $N_{max}$. During a communication session, the number Nλ of transmission channels 13 is variable and adjusted as a function of the magnitude characterizing wave degradation. A control module 41, implemented in the processor 10, is able to determine this number Nλ of transmission channels 13 by means of a first stepwise decreasing function of the magnitude 12 characterizing optical-wave degradation.

The processor 10 also includes encoding and/or interlacing modules 42 for the digital data 11 distributed to each of the transmission channels 13. During a communication session, the encoding rate η used for each of the encoding modules 42 is variable and adjusted as a function of the magnitude 12 characterizing optical-wave degradation. The control module 41 is able to determine this encoding rate η using a second decreasing function of the magnitude 12 characterizing optical-wave degradation.

The effective data 11 distributed over the transmission channels 13, and preferably encoded and interlaced, are then used to modulate optical signals 15 generated by optical sources 14. The device therefore includes means for activating a number of optical sources 14 equal to the number Nλ of transmission channels 13. These activation means notably include optical switches that enable an optical beam to be emitted from an optical source supplied with digital data distributed to a transmission channel 13.

The primary optical signal $S_1$ is then generated by multiplexing the optical signals 15 emitted by the optical sources 14 activated by said activation means, and each of the optical signals 15 is modulated by digital data 13. The wavelength multiplexer 16 is marked WDM on FIG. 4a, which stands for Wavelength Division Multiplexing. The optical power of the optical signal 17 transmitted by the multiplexer 16 may be amplified before transmission according to a predefined total optical power.

As described above, the transmission configuration 102 can be sent using a dedicated device and a tertiary signal $S_3$. It can also be sent using the primary optical signal $S_1$. FIGS. 4a and 4b show this case of transmission by the primary optical signal $S_1$ according to a first possible embodiment. In this first embodiment, the transmission configuration 102, which includes at least the number Nλ of transmission channels and, where applicable, the encoding rate and/or configuration information regarding the interlacing method, is determined by the control module 41 and sent to an encoding module 103, before being inserted into one of the optical carriers by time-division multiplexing (module 104 in FIG. 4a). Thus, the method advantageously includes a time-division multiplexing step, after encoding, of the transmission configuration 102 and of the effective data 11 distributed to one of the transmission channels 13, possibly followed by an interlacing step (module 105 on FIG. 4a) for the data outputted from the multiplexer. It is possible to use different encoding rates for the two data streams (transmission configuration and effective data) to make transmission of the configuration information more robust. Given the very low rate required to send this configuration information, the impact on the effective rate is very limited. To prevent one of the channels from being singled out in relation to the others, as shown in FIG. 4a, the architecture of the channel, including the time-division multiplexer, can be duplicated, at transmission and reception, and applied to all the channels in order to simplify data paralleling by making all of the paths identical. Furthermore, given that the configuration information represents a limited volume of data, it has a small impact on the effective data rate.

The receiver terminal of the transmission device has a functional "mirror" architecture of the functional architecture of the transmitter terminal. Thus, following the step involving wavelength demultiplexing and conversion of the optical information into digital information (converters 26), the method includes a de-interlacing and decoding step for each of the electrical signals 27. In this first embodiment, the transmission configuration 102 is reconstituted during this de-interlacing and decoding step, carried out on the channel carrying the transmission configuration 102. This transmission configuration, sent to the control module 45 of the processor 28, enables the de-interlacing and decoding modules 43 to be provided with the information required, notably the encoding rate and the configuration information for the interlacing method used in the transmitter terminal. Moreover, the number Nλ of transmission channels is provided to a serialization module 44, which is able to reconstitute the digital data 11 by adapting in real time to a variable number of transmission channels. In other words, the method includes a reconstitution step for the digital data 11 received by the receiver terminal configured in real time using the transmission configuration.

Figure 5A:
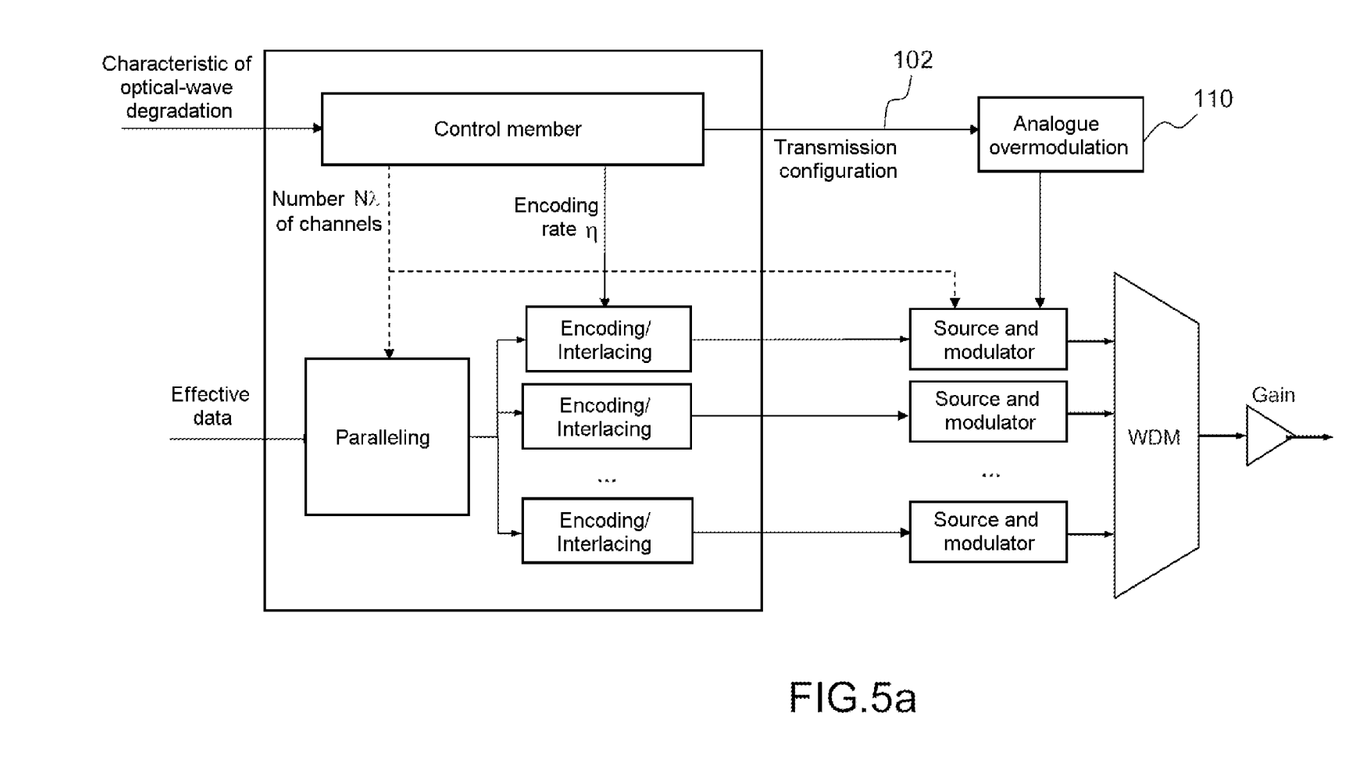
FIGS. 5a and 5b show the functional architecture of a transmitter terminal and of a receiver terminal respectively according to a second embodiment of the invention.
Figure 5B:
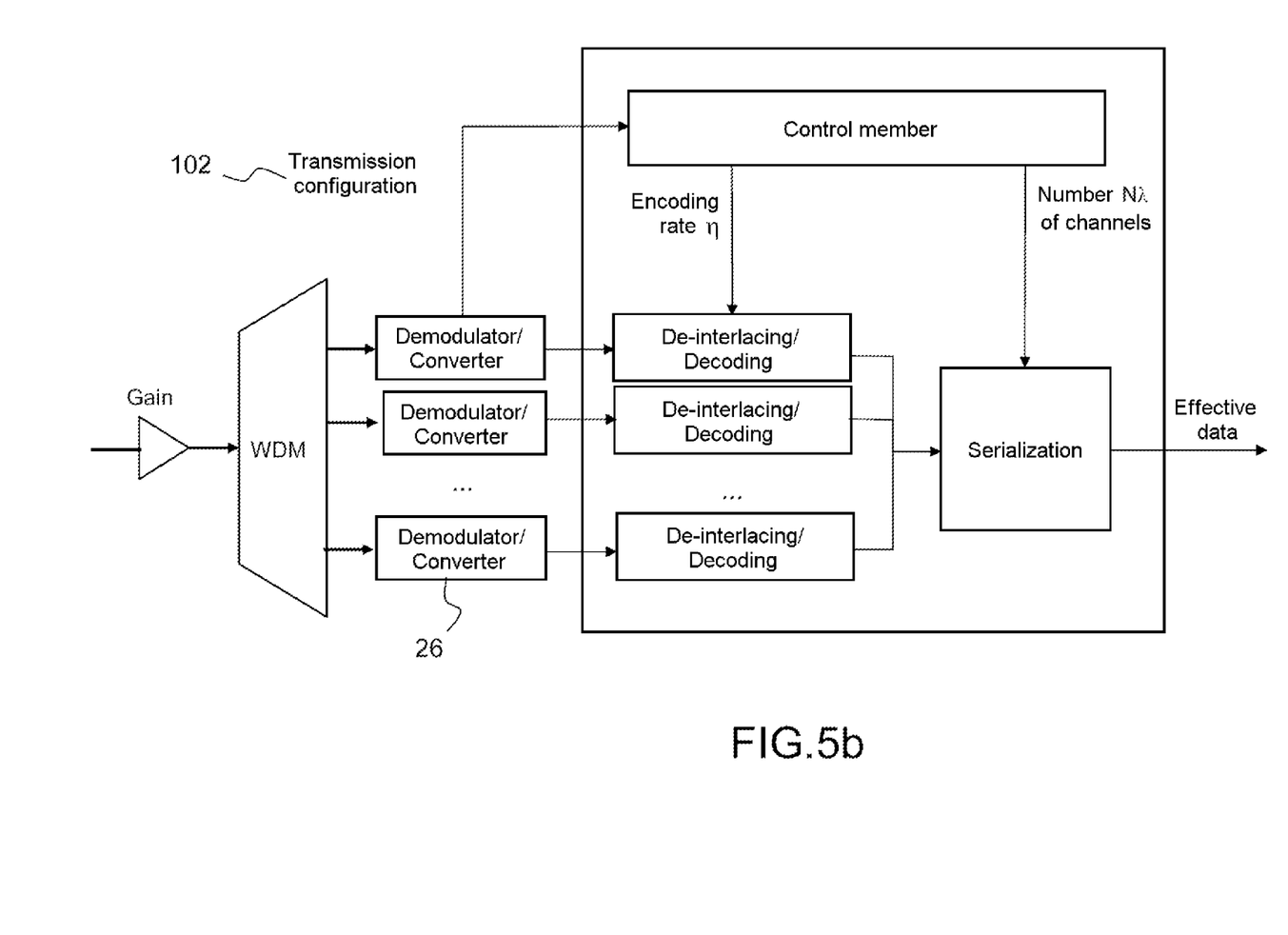

FIGS. 5a and 5b show the functional architecture of a transmitter terminal and of a receiver terminal respectively according to a second embodiment of the invention. This second embodiment includes several modules identical to those shown in FIGS. 4a and 4b. These modules, shown in FIGS. 5a and 5b, are not described again. The second embodiment is different from the first on account of the means used to send the transmission configuration 102. In this second case, the latter is sent to the receiver terminal by overmodulation of one of the optical carriers using the functional module 110 referred to as an analogue overmodulation module. Low-frequency overmodulation is notably used, typically around 10 kHz to 10 MHz, superposed on the high-rate effective data in the form of a pilot tone, or a radio-frequency subcarrier placed outside the baseband spectrum of the electrical signal. Given the digital modulation of the signal used to transmit the effective data, this signal is hardly, if at all, disturbed by adding low-amplitude analogue overmodulation, typically around a few percent, containing information on the configuration used (wavelength number, encoding rate, etc.). In particular, a subcarrier with frequency modulation can be used to encode the configuration used. In the receiver terminal, as shown in FIG. 5*b*, the transmission configuration is reconstituted by appropriate filtering in the electrical domain, i.e. after optical/electrical conversion, using a converter 26. Thus, the method advantageously includes an analogue overmodulation step for one of the optical signals 15 using the transmission configuration 102.

Figure 6:
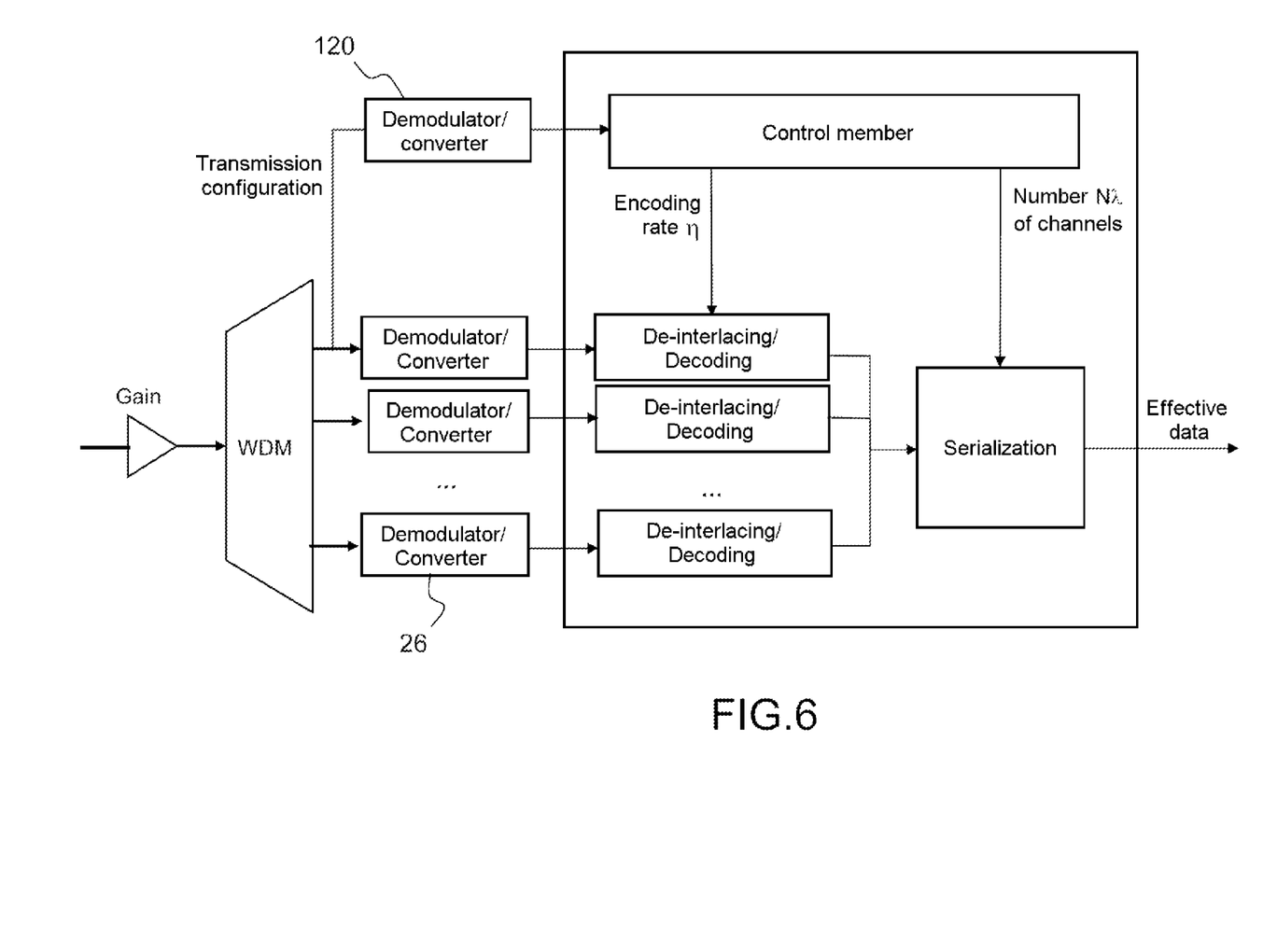
FIG. 6 shows the functional architecture of a receiver terminal according to a third embodiment of the invention.

FIG. 6 shows the functional architecture of a receiver terminal according to a third embodiment of the invention. In this embodiment, the transmission configuration is reconstituted using a dedicated optical/electrical converter 120. Finally, it should be noted that another possible embodiment involves using an additional wavelength exclusively to implement an out-band signaling channel. Given the very low rate required to send this signaling information, the power of this signal can be very low in relation to the wavelengths used for sending the effective data, thereby having no negative impact on the optical power of the effective data signals. Indeed, the optical amplifier works at a constant output optical power and distributes the power between the different wavelengths used. This latter embodiment has the drawback of requiring a specific wavelength to send the transmission configuration 102, but has the advantage of having no impact on the channels used to send the effective data 11.

Figure 7:
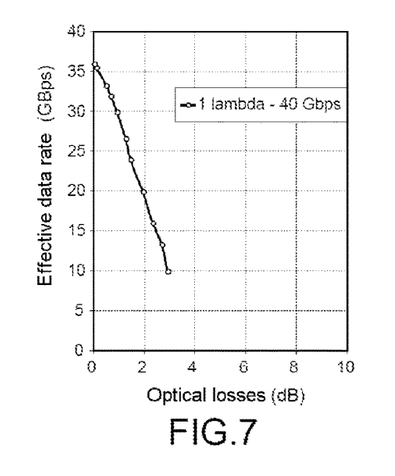
FIG. 7 shows the operating principle of an optical transmission method according to the known prior art.
Figure 8A:
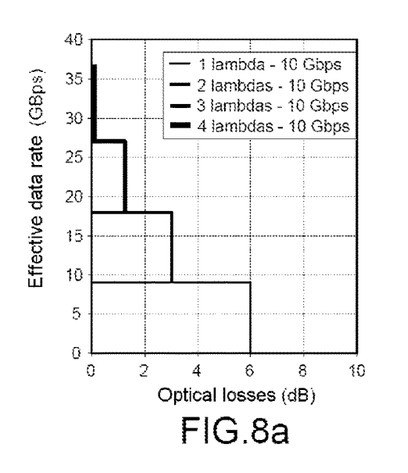
FIGS. 8a and 8b show the operating principle of an optical transmission method according to two variants of the invention.
Figure 8B:
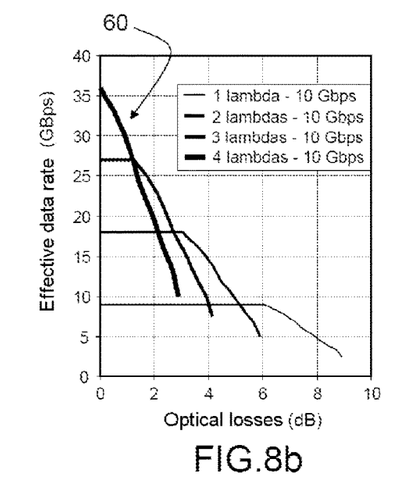

FIG. 7 shows the operating principle of an optical transmission method according to the known prior art, in which the encoding rate is adapted. FIG. 8*a* shows the operating principle of an optical transmission method according to a first aspect of the invention in which the number of transmission channels is adapted to the transmission conditions. FIG. 8*b* shows the operating principle of an optical transmission method according to a second aspect of the invention in which the encoding rate and the number of transmission channels are adapted to the transmission conditions.

These three figures show the effective data rate as a function of the optical losses between the transmitter terminal and the receiver terminal. For these three empirical figures, a bit error rate close to zero is required on reception, and a threshold value after decoding of $10^{-12}$, representing a known requirement, is used. In FIG. 7, the transmission device includes an optical source with a nominal gross rate (including redundancy bits inserted by the error-correcting code) of 40 Gigabits per second (Gbps). A variable encoding rate adjusted as a function of optical losses is used. An encoding rate of 90% is used for zero optical losses, in which case the effective data rate is 36 Gbps. As the optical losses increase, the encoding rate is reduced to keep a near-zero bit error rate. This technique, which is effective for moderate-amplitude optical losses, becomes ineffective for more significant optical losses.

In FIG. 8*a*, the transmission device includes four optical sources each having a nominal gross rate of 10 Gbps and multiplexing means. For limited optical losses, the method according to the invention uses a high number of transmission channels, and the effective rate is distributed over four wavelengths. A fixed encoding rate of 90% is used for each of the transmission channels. For zero optical losses, the effective data rate is then 36 Gbps. As optical losses increase, the method reduces the number of transmission channels. For high optical losses, for example between 4 and 6 dB, a single optical source is used.

The transmission device in FIG. 8*b* also includes four sources each having a nominal rate of 10 Gbps. In this case, the device also includes multiplexing means and variable-rate encoding means. For limited optical losses, the method according to the invention uses a high number of transmission channels, and the effective rate is distributed over four wavelengths. As the optical losses increase, the encoding rate is progressively reduced. If these optical losses are greater than a predetermined threshold, the method according to the invention uses fewer transmission channels. Thus, the envelope curve 60 in FIG. 8*b* may be used in the control module 41 of the processor 10 to determine, at each instant, the number of transmission channels 13 and the encoding rate η.

Thus, adaptation of the encoding rate advantageously enables the effective rate to be adjusted for relatively small variations in the transmission conditions. The combination of adaptation of the number of multiplexing channels and of the encoding rate enables both coverage of an extended range of transmission conditions and fine tuning of the effective rate within this range. This configuration is particularly advantageous, for example in the case of a satellite used to relay data. During a communication session, the satellite has to transmit a volume of data, for example images, to a fixed terrestrial terminal. This type of satellite is generally in low orbit, the duration of a communication session is short, and it is beneficial to optimize data transfer during the period. The method selects a suitable number of channels as a function of the transmission conditions measured at each instant of the communication session. To optimize the effective rate while keeping the error rate within acceptable limits, the method also adjusts the effective rate using the encoding rate. This dual adaptation advantageously enables the effective rate to be optimized for a given available optical power, for example that delivered by an optical amplifier used in saturation.

The invention claimed is:

1. A method for transmitting digital data through space and/or the atmosphere by a primary optical signal between a transmitter terminal and a receiver terminal, comprising the following steps:
   determining a magnitude characterizing optical-wave degradation between the transmitter terminal and the receiver terminal,
   determining a number of transmission channels by a first stepwise decreasing function of the magnitude characterizing optical-wave degradation,
   distributing the digital data over the transmission channels,
   modulating optical signals of different wavelengths, of which there are as many as there are transmission channels; each of the respective optical signals being modulated by digital data distributed respectively to one of the transmission channels,
   generating the primary optical signal by wavelength multiplexing of the optical signals, and
   sending a transmission configuration through space and/or the atmosphere from the transmitter terminal to the receiver terminal; the transmission configuration including at least the number of transmission channels.

2. The method as claimed in claim 1, further comprising:
   determining an encoding rate, using a second decreasing function of the magnitude characterizing optical-wave degradation,
   encoding the digital data distributed to each of the transmission channels according to the previously determined encoding rate;
   the encoding rate being defined as a ratio between an effective bit rate and an output bit rate transmitted from an encoder; the transmission configuration also including the encoding rate.

3. The method as claimed in claim 1, further comprising an interlacing step for the digital data distributed to each of the transmission channels; the transmission configuration also including information relating to an interlacing configuration.

4. The method as claimed in claim 1, wherein the magnitude characterizing optical-wave degradation is determined by measuring, at the transmitter terminal, a secondary optical signal sent by the receiver terminal and received by the transmitter terminal; and wherein the magnitude characterizing optical-wave degradation comprises a magnitude characterizing optical-wave degradation through space and/or the atmosphere.

5. The method as claimed in claim 1, wherein the magnitude characterizing optical-wave degradation is determined by calculation using a predetermined function.

6. The method as claimed in claim 1, further comprising a time-division multiplexing step for the transmission configuration and effective data distributed to at least one of the transmission channels.

7. The method as claimed in claim 1, further comprising an analogue overmodulation step for one of the optical signals using the transmission configuration.

8. The method as claimed in claim 1, further comprising a reconstitution step for the digital data received by the receiver terminal configured in real time using the transmission configuration.

9. A device for transmitting digital data through space and/or the atmosphere using a primary optical signal including a transmitter terminal and a receiver terminal; said transmitter terminal comprising:
a processor configured to distribute and send digital data over transmission channels,
optical sources configured to send optical signals of different wavelengths through space and/or the atmosphere; each of the optical sources having a modulator to modulate the optical signal of said optical source as a function of digital data sent by the processor over a transmission channel, and
a wavelength multiplexer configured to generate the primary optical signal by wavelength multiplexing of optical signals sent by the optical sources;
and further comprising:
the processor configured to determine a magnitude characterizing an optical-wave degradation between the transmitter terminal and the receiver terminal,
the processor configured to distribute the digital data over a number of transmission channels that is less than or equal to the number of optical sources,
the processor configured to determine the number of transmission channels with a stepwise decreasing function of the magnitude characterizing optical-wave degradation, and
a number of optical sources equal to the number of transmission channels and the optical sources being configured to be activated; the primary optical signal being generated by multiplexing the optical signals sent by the optical sources thus activated; each of the optical signals being modulated by digital data.

10. The device as claimed in claim 9, in which the processor of the transmitter terminal is further configured to encode digital data distributed to each of the transmission channels,
said encoding being characterized by a variable encoding rate determined by the processor configured to implement a decreasing function of the magnitude characterizing optical-wave degradation, and said encoding rate being defined as a ratio between an effective bit rate and a bit rate outputted from an encoder.

11. The device as claimed in claim 9, in which the processor of the transmitter terminal is further configured to interlace digital data distributed to each of the transmission channels.

12. The device as claimed in claim 9, wherein the receiver terminal includes an optical source and an optical transmission interface that are configured to transmit a secondary optical signal to the transmitter terminal, and an optical receiver interface of the secondary optical signal that is configured to receive the secondary optical signal; the magnitude characterizing optical-wave degradation between the transmitter terminal and the receiver terminal being measured by receipt of the optical signal; and wherein the magnitude characterizing optical-wave degradation comprises a magnitude characterizing optical-wave degradation through space and/or the atmosphere.

13. The device as claimed in claim 9, wherein the transmitter terminal includes an optical power amplifier to amplify the primary optical signal.

14. The device as claimed claim 9, wherein the transmitter terminal includes a device configured to transmit a tertiary signal to the receiver terminal, and in which the receiver terminal includes a device configured to receive the tertiary signal; and the tertiary signal carrying a transmission configuration including at least the number of transmission terminals, enabling the receiver terminal to process the effective data sent by the primary optical signal.

15. The device as claimed in claim 14, wherein the tertiary signal is an optical signal with a wavelength different from the wavelengths of the optical signals carrying the effective data.

16. The device as claimed in claim 14, wherein the tertiary signal is a hyperfrequency signal.

17. The device as claimed in claim 9, wherein the receiver terminal includes:
a wavelength demultiplexer that is configured to generate optical signals of different wavelengths by demultiplexing the primary optical signal,
converters that are configured to convert each of the optical signals of different wavelengths into electrical signals, and
a processor configured to recombine electrical signals to reconstitute the digital data sent by the transmitter terminal.

18. A method for transmitting digital data through free space by a primary optical signal between a transmitter terminal and a receiver terminal, comprising the following steps:
determining a magnitude characterizing optical-wave degradation between the transmitter terminal and the receiver terminal,
determining a number of transmission channels by a first stepwise decreasing function of the magnitude characterizing optical-wave degradation,
distributing the digital data over the transmission channels,
modulating optical signals of different wavelengths, of which there are as many as there are transmission channels; each of the respective optical signals being modulated by digital data distributed respectively to one of the transmission channels,
generating the primary optical signal by wavelength multiplexing of the optical signals, and sending a transmission configuration through free space from the transmitter terminal to the receiver terminal; the transmission configuration including at least the number of transmission channels.

19. The method as claimed in claim 18, further comprising:
   determining an encoding rate, using a second decreasing function of the magnitude characterizing optical-wave degradation,
   encoding the digital data distributed to each of the transmission channels according to the previously determined encoding rate;
   the encoding rate being defined as a ratio between an effective bit rate and an output bit rate transmitted from an encoder; the transmission configuration also including the encoding rate.

20. The method as claimed in claim 18, further comprising an interlacing step for the digital data distributed to each of the transmission channels; the transmission configuration also including information relating to an interlacing configuration.

\* \* \* \* \*